Oct. 11, 1966

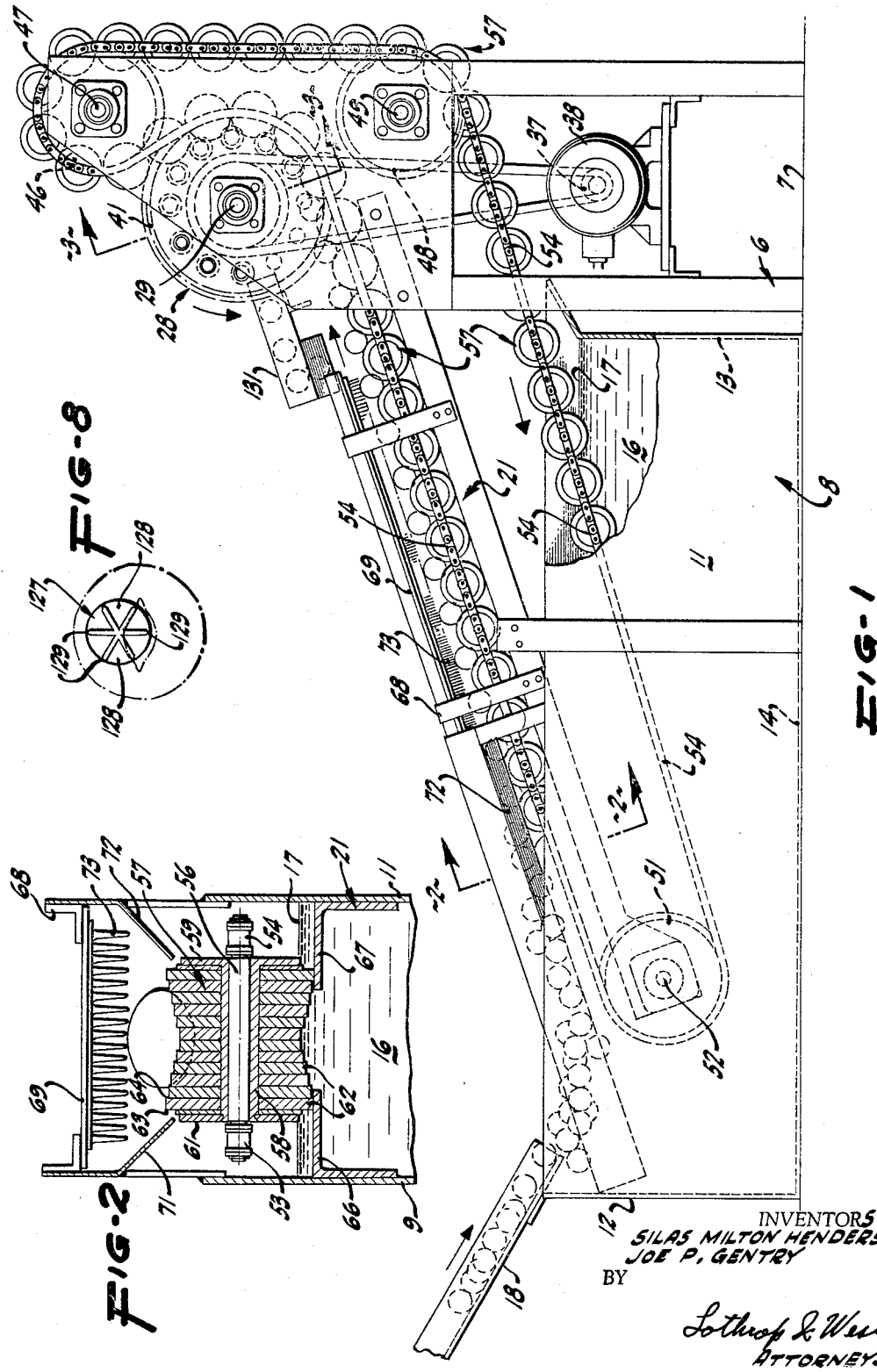

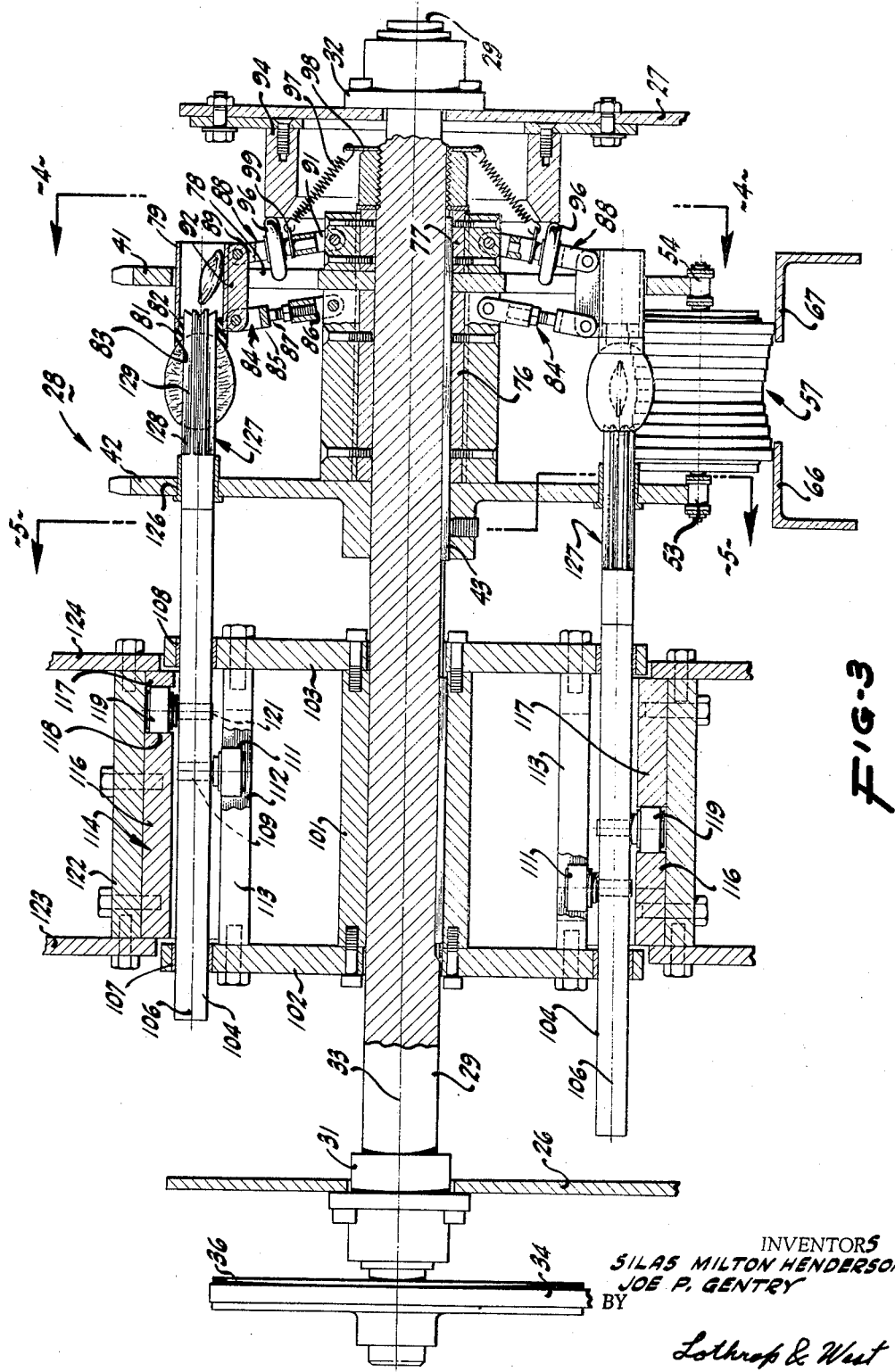

S. M. HENDERSON ET AL 3,277,940

PRUNE PITTING MACHINE

Filed Nov. 7, 1963

INVENTORS
SILAS MILTON HENDERSON
JOE P. GENTRY
BY

Lothrop & West
ATTORNEYS

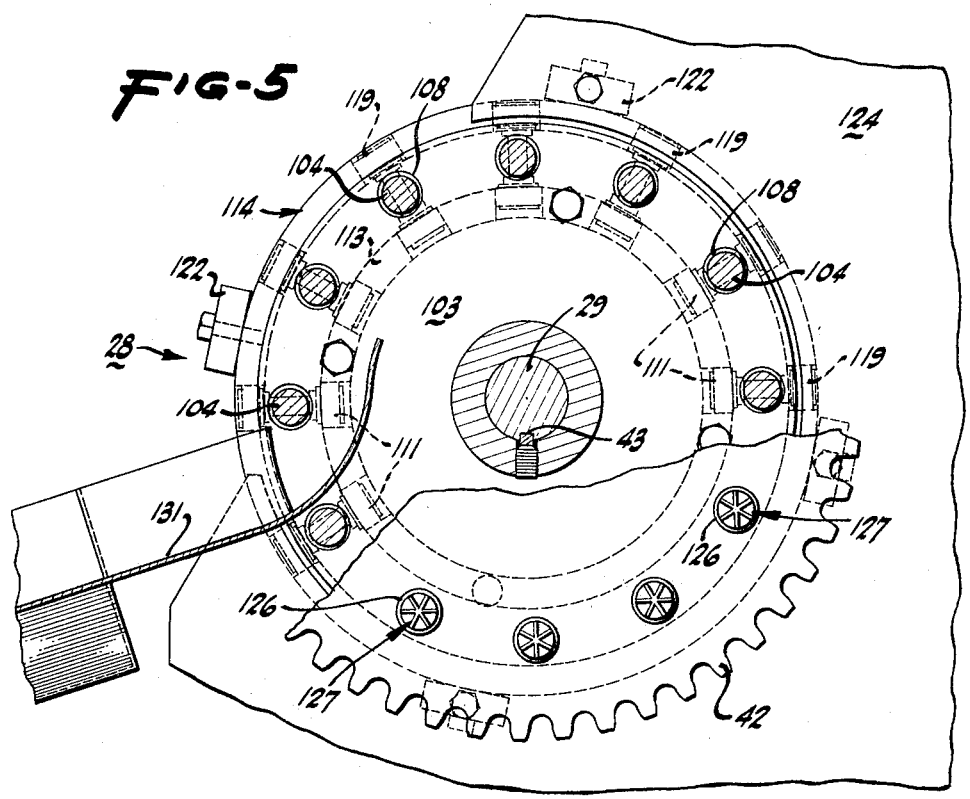
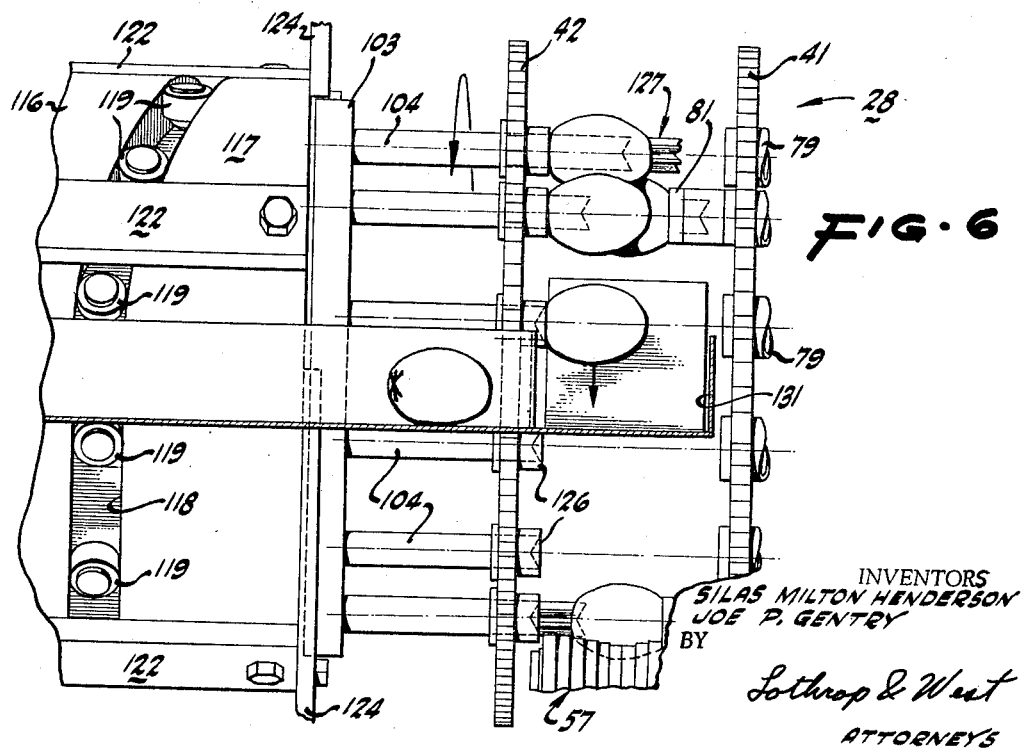

United States Patent Office 3,277,940
Patented Oct. 11, 1966

3,277,940
PRUNE PITTING MACHINE
Silas Milton Henderson and Joe P. Gentry, Davis, Calif., assignors to The Regents of the University of California, Berkeley, Calif.
Filed Nov. 7, 1963, Ser. No. 322,091
13 Claims. (Cl. 146—17)

Our invention relates to means for removing the pits from fruit such as prunes prior to the time that the fruit is dried and preferably when such fruit is freshly picked and is in ripe condition. This fruit is sometimes referred to as plums or prune-plums.

Prunes have heretofore been pitted after being dried. Pitting in this fashion on a commercial scale has been attended by difficulties and does not provide a superior product. Our determinations have shown that prunes which have their pits removed while the fruit is still fresh not only are dried into final commercial condition faster and easier, but likewise constitute a substantially improved product from the standpoint of taste, appearance and other critical factors.

It is therefore an object of the invention to provide a prune pitting machine effective successfully to pit prunes while the fruit is in fresh condition.

Another object of the invention is to provide a prune pitting machine in which the particular location of the pitting instrumentality with respect to the fruit pit is not highly critical.

Another object of the invention is to provide a prune pitting machine in which the fruit to be pitted is handled carefully and gently to avoid bruising and damage.

Another object of the invention is to provide a prune pitting machine in which the fruit is automatically oriented so that the pitting instrumentality produces substantially the same effect on all of the fruit.

Another object of the invention is to provide a prune pitting machine of simple mechanical characteristics so that it can readily be operated for protracted periods without attention and servicing.

Another object of the invention is in general to provide an improved prune pitting machine.

Other objects together with the foregoing are attained in the embodiment of the invention described in the accompanying description and illustrated in the accompanying drawings, in which:

FIGURE 1 is a side elevation of a prune pitting machine constructed pursuant to the invention, certain portions being broken away to disclose the interior arrangement of the device;

FIGURE 2 is a cross section to an enlarged scale, the plane of section being indicated by the line 2—2 of FIGURE 1;

FIGURE 3 is a cross section to an enlarged scale, the plane of section being indicated by the line 3—3 of FIGURE 1;

FIGURE 5 is a detail in cross section, with portions broken away, the planes of section being indicated by the lines 5—5 of FIGURE 3;

FIGURE 6 is an elevation of a portion of the pitting drum showing the discharge for the pitted fruit;

FIGURE 8 is a diagrammatic or schematic illustration of a pitting instrumentality piercing a prune eccentrically.

Figure 4:
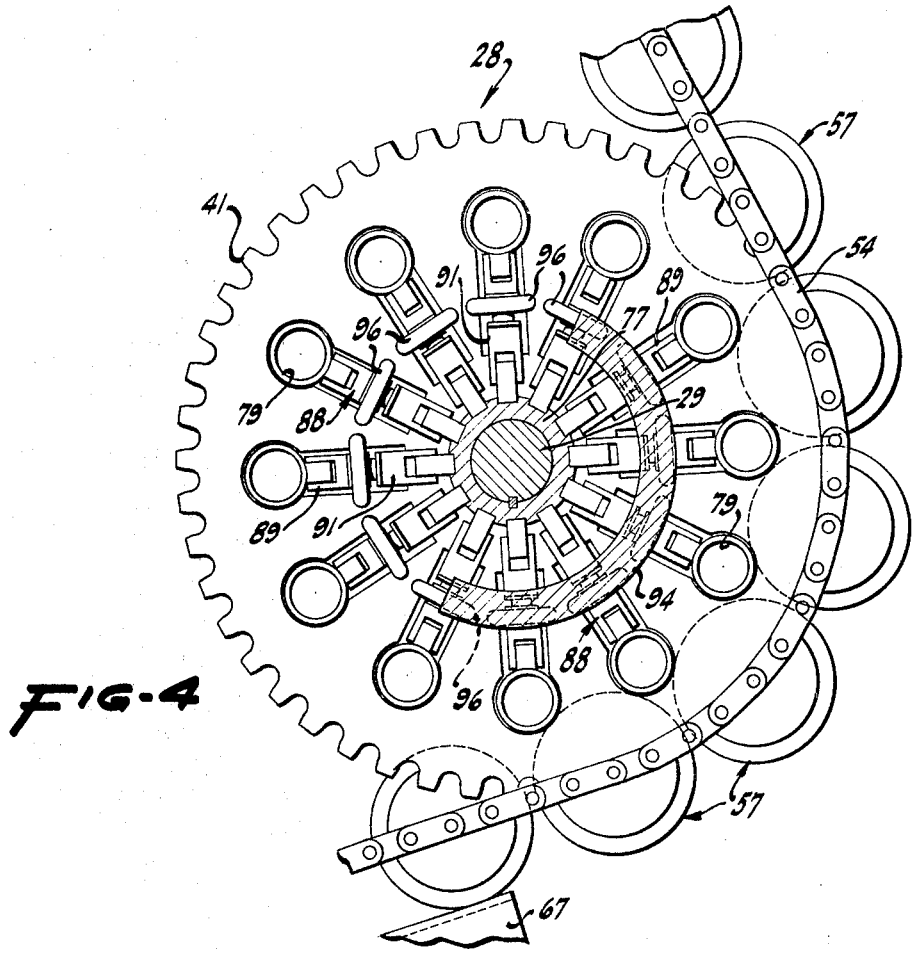
FIGURE 4 is a detail in cross section, the plane of which is indicated by the line 4—4 of FIGURE 3.

While the prune pitting machine is primarily designed for use on fresh prunes and is so described herein as a preferred example, the machine is also useful in connection with other fruits, particularly drupaceous fruits, and can even be adapted for use on other agricultural products of comparable mechanical constituency.

In the particular form disclosed herein, which has been successfully operated on prunes previously graded into generally comparable sizes, the machine includes a structural main frame 6 designed to be supported on a floor 7 or other comparable foundation and is arranged adjacent to a water tank 8. This is also supported on the floor 7 and includes a pair of side walls 9 and 11 as well as end walls 12 and 13 and a bottom wall 14. The tank is relatively long and narrow and is designed to contain a body 16 of water at an approximate level 17. The fruit to be pitted is supplied to the tank 8 from a chute 18 which discharges the individual prunes in random fashion into the body 16 of water. The density of the prunes is such that they tend to sink below the water surface 17 in a random array. The receipt of the prunes in the body of water precludes any major damage due to impact or bruising.

In order to entrain the prunes for processing in the machine, there is provided a conveyor frame 21 made up of appropriate shapes and angles secured at one end to the main frame 6 and at its other end disposed beneath the level 17 of the water body 16 within the tank 8. The frame 21 inclines upwardly from the point of receipt of the prunes within the tank 8 toward the main frame 6.

Disposed between side plates 26 and 27 included in the main frame at the head of the conveyor frame 21 is a pitting drum, generally designated 28. This includes a cross shaft 29 carried by journals 31 and 32 in the plates 26 and 27 and operating about a horizontal axis 33. The shaft 29 is rotated by a drive belt 34 encompassing a pulley 36 on the shaft 29 and also encompassing a pulley 37 on a drive motor 38 mounted on the main frame 6.

Also mounted on the shaft 29 and spaced relatively close to each other thereon are sprockets 41 and 42. These are made fast to the shaft, being secured thereto through a key 43, so that the sprockets likewise revolve when the motor 38 is energized. Also mounted in alignment with the sprockets 41 and 42 is a pair of following sprockets 46. These are secured on a horizontal shaft 47 journalled on the frame 6. As well, a pair of idler sprockets 48, similarly spaced apart, is journalled on a horizontal shaft 49 on the main frame 6. Finally, journalled at the lower end of the conveyor frame 21 is a pair of leading sprockets 51. These are equally spaced apart and are carried by a cross shaft 52 mounted in appropriate journals to turn about a horizontal axis.

Trained around the respective ones of the sprockets in the various pairs are conveyor chains 53 and 54 (see FIGURE 2) arranged in such a fashion that the chains are convexly engaged with all of the sprockets except for the pitter drum sprockets 41 and 42 around which the chains extend in a concave fashion.

Certain ones of the various links in the chains 53 and 54 carry cross spindles 56 rotatably mounted and each serving as the support of an orienting roller 57. Each horizontal spindle 56 is surrounded by a bushing 58 having flanged ends 59 and 61 serving to confine a plurality of disks 62. Conveniently, the disks are made of leather, rubber or a comparable elastomeric material having some resiliency but effective to maintain the initial shape of the disks for protracted periods. Each disk is characterized by relatively sharp corners 63 and 64 at each rim. The disks vary symmetrically in size from end to end of the orienting roller so that the roller is relatively smaller in diameter near and at the middle and is larger in diameter at both opposite ends thereof, so that there is a stepped, approximately hour glass shape to each of the rollers. Alternatively, the rollers are smooth.

Figure 7:
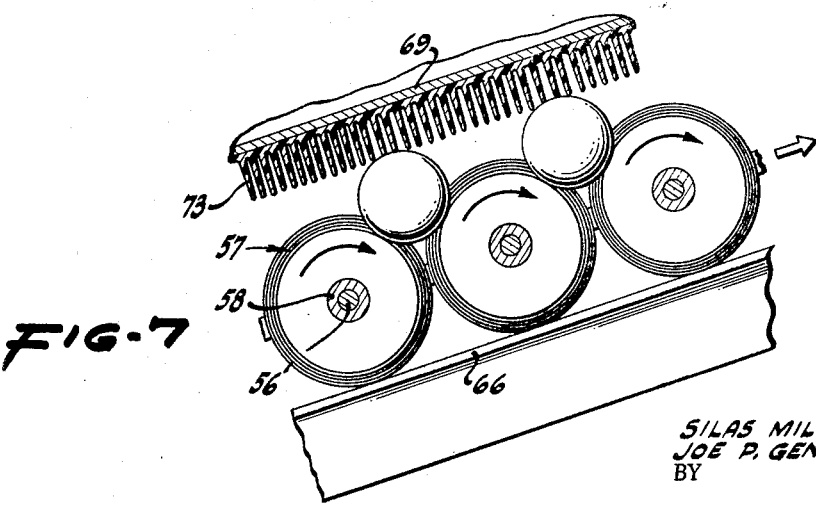
FIGURE 7 is a side elevation, with parts removed, and some portions in section of the fruit orienting rollers and fingers.

The weight of the orienting rollers and the upper run of the conveyor chain is sufficient to cause the rollers, at least the outermost disks thereof, to rest upon the subjacent one of a pair of angles 66 and 67 on the conveyor frame. As the upper run of the conveyor travels upwardly along the conveyor frame, all the orienting rollers are revolved in the same direction, particularly as illustrated in FIGURE 7. The configuration and dimensions of the rollers are such that prunes disposed in the water are randomly entrained between adjacent rollers and are supported thereby and are lifted out of the water as the conveyor advances. As the rollers revolve, the prunes are by frictional engagement tumbled and rotated. Eventually the prunes tend toward an orientation in which the longitudinal axis of the fruit (extending between the stem end and the flower end of the fruit) tends to become aligned with the axes of the rollers, or tends to become horizontal transversely of the machine.

To assist in guiding the fruit onto the orienting rollers, there are provided deflectors 71 and 72. These extend from beneath the water in the tank to a position above the water and tend to keep the fruit confined to the feeding and orienting area of the conveyor. In fact, the deflectors are disposed at their lower edges just alongside the chains 53 and 54, so that fruit is directed to lodge in the cavities between adjacent orienting rollers.

Particulary to assist in the orienting operation and also to ensure that the space between adjacent rollers contains but one prune at a time, the conveyor framework 21 is provided with a superstructure 68 carrying a mounting plate 69 for a plurality of depending orienting fingers 73. These preferably are smooth projections extending from a rubber or other elastomeric base and project toward the orienting rollers to leave a path therebetween for the prunes. This path is considerably smaller than the diameter of the size of prunes being handled, so that in addition to being rotated by the rollers, the fruit in brushing against the orienting fingers tends to be tumbled and aligned by them. The individual prunes are thus properly positioned. The fingers are particularly effective to brush off or brush back any surplus prunes in any one cavity between the rollers.

It has been found by experience that the prunes tend to orient themselves, especially as shown diagrammatically in FIGURE 7, with their axes transversely of the machine and arranged horizontally on the orienting rollers well before the conveyor has travelled completely to the pitting drum 28. It is immaterial whether the stem end or the flower end of the fruit is to the left or to the right since prunes are sufficiently symmetrical or the position of the seed within the prune is sufficiently uniform that it is immaterial from which end the pitting takes place. It is important, however, that the prune be arranged with its longitudinal axis horizontally disposed. The well-defined edges on the disks tend to hold the wet prunes against lateral slipping and dislodgment and tend to hold them centralized transversely.

After the prunes are lifted from the water, rotated, oriented, brushed and raised above the tank 8, they are brought into the vicinity of the pitting drum 28 and are carried with the conveyor chains generally in a concave path around a portion of the pitting drum.

Pursuant to the invention, means are provided for transferring the oriented prunes from the conveyor chain to the pitting drum itself. For that reason, a pair of collars 76 and 77 is fastened or keyed to rotate with the shaft 29, the collars being disposed on opposite sides of the sprocket 41. Arranged to operate on horizontal axes parallel to the axis 33 and disposed to operate through openings 78 in the sprocket 41 is a plurality of sleeves 79.

Each of the sleeves 79 is preferably a metallic tube open at both ends and is provided at its inner end with a rubber or other elastomeric cup 81. Each cup is preferably formed with a neck 82 telescopically received in the sleeve 79 and has a concavity 83 for close abutment with a prune. The cup also has a relatively thin end wall which is readily pierced. Each of the sleeves is mounted for motion on a parallelogram link support. One of the links 84 is made up of a pair of pivoted end clevises 85 and 86 joined by an adjusting bolt 87, whereas the other parallel link 88 is also made up of a pair of clevises 89 and 91. The various clevises are pivoted to a frame 92 joined to the sleeve 79 and to the hubs 76 and 77. With this linkage, the motion of the sleeve 79 and of the cup 81 is approximately rectilinear in a horizontal direction.

To govern the motion of the sleeves and cups to various positions as the pitting head revolves, there is provided on the frame plate 27 a ring cam 94 with an undulatory end contour. Running against the ring cam are rollers 96 on the respective links 88. Springs 97 at one end are fastened to a disk 98 on the shaft 29 and at the other end are secured to clips 99 on the links 88. Thus the sleeves 79 are maintained in retracted position by the springs 97 against the urgency of the cam, so that as the shaft 29 rotates, the sleeves are made to follow an undulatory path as governed by the cam.

In a related fashion, there is also mounted on the shaft 29 a hub 101 carrying mounting plates 102 and 103 for supporting a plurality of pitting rods 104. Each pitting rod 104 is disposed with its axis 106 in a horizontal direction parallel to the axis 33 and is mounted for rectilinear translation in bushings 107 and 108 in the plates 102 and 103. The rod is preferably made round in cross section and to keep it from rotating about its own axis, the rod is provided with a cross pin 109 serving as a mount for a roller 111. A transverse groove 112 is arranged between cross pieces 113 spanning the space between the heads 102 and 103 and confines the roller 111. Thus, the pitting rod can reciprocate horizontally but cannot rotate.

Encompassing all of the pitting rods is a drum cam 114 made up of two portions 116 and 117 arranged concentrically on the axis 33 and shaped to provide an undulatory groove 118. Designed to operate between the walls of the groove 118 is a roller 119 disposed on a stub shaft 121 projecting from the pitting rod 104. The two parts 116 and 117 of the drum cam are held together by straps 122 mounted between side plates 123 and 124 connected to the main frame 6. As the shaft 29 revolves, the rollers 119 follow the cam groove 118 and cause rectilinear translation of the pitting rods, which therefore follow an undulatory path as the shaft 29 rotates. This undulatory path is so arranged with respect to that provided by the cam 94 as to cause the pitting rods and the sleeves simultaneously to approach each other and then to retreat simultaneously from each other. The approaching motion occurs as the fruit is first brought by the conveyor chain around the pitting drum in a concave fashion.

The pitting rods 104 are further supported by passing through the sprocket 42 and are guided by bushings 126 therein. Adjacent the portion of each pitting rod that engages the bushing 126 and disposed at the inner terminus of the pitting rod is a pitting knife 127. The knife is machined with a plurality of flutes 128 equally disposed around the periphery of the rod and leaving ridges 129 therebetween. The end of the rod is cut back and cut away to provide an indented or recessed and sharpened ribbed end. We have found by experience that it is necessary to have a minimum of six radial or cross ribs at the end of the pitting knife; otherwise it is possible for a prune pit to be bypassed, particularly if the fruit is out of position. That is not true of the six-bladed arrangement as shown in FIGURE 8. In that figure, two of the blades are shown ineffectively passing around the pit because there is an eccentricity or misalignment between the knife and the fruit. Even so, one of the pitting blades is sufficient to engage the pit and move it longitudinally out of the fruit.

As prunes are brought into proximity with the sleeves and pitting knives, and as the fruit revolves on the pitting drum, the supporting sleeves and cups move to engage the prunes and the pitting rods likewise move to engage the fruit by perforation. The fruit is thus lifted onto the pitting drum in a symmetrical fashion, the previously oriented fruit being engaged approximately on its axis. Each fruit is in turn lifted from the cavity between successive orienting rollers and is carried around in an individual position on the pitting drum.

As the fruit rotates with the pitting drum, the position of the sleeves, having once advanced, remains substantially constant. The pitting knives, after an initial engagement, are driven completely through the fruit. Each knife engages the internal pit and forces it axially to cut through the flesh of the fruit at the cut end and to be dislodged through the elastomeric cup 81 into the sleeve. Initially, the cups are not perforated and the first operation of the ejected seeds and of the knives is sufficient to cut central openings in the cups. It is preferred that the knives pass entirely through the fruit and entirely through the cups into the sleeves.

The pitting operation is substantially completed as the pitting knives and cups approach the uppermost position on the wheel and in fact is often completed somewhat before that location. Depending upon the individual prunes, the pits are usually ejected with sufficient force so that they do not remain within the sleeves, but are forcibly ejected against the plates 27 and fall into a disposal receptacle. The pitted fruit itself is impaled temporarily on the pitting knife, but as the pitting drum revolves, both the supporting sleeves 79 and the pitting knives are retracted. As the knives retract, they withdraw from the fruit, which if necessary abuts against the extended bushings 126 and is held against further axial translation during the final withdrawal of the knives.

The fruit being thus completely released from the pitting mechanism, drops by gravity into a chute 131 (FIGURE 6) and travels from the machine. The fruit is pierced and deflected and distorted by the ejecting pit and by the blades of the knife, but tends to regain its former position when the knife is withdrawn. Although there are cuts at both ends of the fruit, these tend to narrow reasonably well and the prunes return to their original contours approximately. The cuts remain slightly open so that during subsequent drying operations there is a circulation of dry air through the interior of the prune or a discharge of internal moisture through both ends, all in addition to the circulation of drying air over the outside. The drying process is substantially accelerated.

The orienting rollers after being deprived of their fruit travel farther around the sprockets 46, then around the idler sprockets 48 to reenter the tank 8. The orienting rollers are washed and cleaned as they travel through the water and return around the feeding sprockets 51 for repetition of the cycle.

What is claimed is:

1. A prune pitting machine comprising a main frame, a water tank adjacent said main frame, a pitting drum, a pair of pitting sprockets on said drum, means for journalling said pitting drum on said main frame for rotation about a horizontal drum axis, a conveyor frame extending from said main frame substantially tangent to said pitting drum into said water tank, a pair of leading sprockets, means for journalling said leading sprockets on said conveyor frame for rotation about a horizontal axis and at least partly submerged in said water tank, a pair of following sprockets, means for mounting said following sprockets on said main frame for rotation about a horizontal axis above said drum axis, a pair of idling sprockets, means for mounting said idling sprockets on said main frame for rotation about a horizontal axis below said drum axis, a pair of conveyor chains trained convexly about said leading sprockets, said following sprockets and said idling sprockets and trained concavely about said pitting sprockets, a plurality of orienting rollers, means for journaling said orienting rollers on said conveyor chains for rotation about horizontal axes, tracks on said conveyor frame for engaging and supporting said orienting rollers, means for advancing said conveyor chains and thereby rotating said rollers about their own axes and rotating said pitting drum about said drum axis, orienting fingers on said conveyor frame and extending longitudinally of said conveyor chains above said rollers, deflectors on said conveyor frame extending alongside said conveyor chains from a point beneath water in said water tank to a point above water in said water tank, a plurality of supporting sleeves, means including a parallel link motion for mounting said sleeves on said pitting drum for movement parallel to said drum axis, a ring cam on said main frame, cam followers included in said sleeve mounting means, springs for urging said cam followers against said ring cam, a plurality of pitting rods, means on said pitting drum for mounting said rods for reciprocation parallel to said drum axis, means for constraining said pitting rods against rotation about their own axes, a drum cam on said main frame, cam followers on said pitting rods engaging said drum cam, said drum cam and said ring cam being shaped to move said supporting sleeves and said pitting rods toward each other during the approximate arc that said conveyor chains are in engagement with said pitting sprockets and then away from each other, and means on said main frame for receiving prunes released by said supporting sleeves and pitting rods.

2. A prune pitting machine as in claim 1 in which said pitting rods have at least six radial blades at the ends adjacent said supporting sleeves.

3. A prune pitting machine as in claim 1 in which said supporting sleeves have elastomeric prune-engaging cups at the ends adjacent said pitting rods.

4. A prune pitting machine as in claim 1 in which said supporting sleeves and said pitting rods telescope at a location between said pitting sprockets.

5. A prune pitting machine as in claim 1 in which said orienting rollers are smaller in diameter at the center than they are at the ends.

6. A prune pitting machine as in claim 1 in which said orienting rollers are provided with a plurality of annular steps.

7. A prune pitting machine as in claim 1 in which the spacing of adjacent orienting rollers and said orienting fingers is such that a prune is simultaneously engaged thereby.

8. A prune pitting machine as in claim 1 in which said deflectors guide prunes in water in said tank along a path substantially coincident with the path of said orienting rollers.

9. A prune pitting machine as in claim 1 in which said conveyor frame at the end remote from said pitting drum is disposed below the normal level of water in said water tank.

10. A prune pitting machine comprising a rotary pitting drum, a chain conveyor having a first free portion and a second portion trained partially around said pitting drum, means for supplying said first free portion with prunes, means for advancing said conveyor and rotating said drum, means on said chain conveyor for orienting said prunes while said prunes are on and entirely supported by said first free portion of said chain conveyor, means for transferring oriented prunes from said second portion of said conveyor to said drum, and means for pitting transferred prunes on said drum.

11. A prune pitting machine comprising a frame, a conveyor, means for advancing said conveyor on said frame in a predetermined plane and through a predetermined distance from a receiving station to a pitting station, a pair of prune orienting rollers each smaller in diameter adjacent the middle than at the ends, means for mounting said rollers on said conveyor for rotation relative to each other about axes normal to said plane and simultaneously to engage the lower portion of a prune at said receiving station, means fixed on said frame adapted to be engaged by said rollers and effective during the operation of said advancing means for rotating said rollers relative to each other to assist in orienting a prune engaged thereby to lie adjacent said middle and during the advance of said prune with said conveyor, means on said frame at said pitting station and including a sleeve and a pitting rod in alignment on opposite ends of an oriented prune on said rollers adjacent said middle and at said pitting station, means on said frame for engaging said sleeve with a prune lying on said rollers adjacent said middle, and means on said frame for forcing said pitting rod through said prune lying on said rollers and adjacent said middle and into said sleeve in a direction normal to said plane.

12. A prune pitting machine as in claim 11 in which means are provided for lifting said prunes in said plane from said rollers as said conveyor advances in the vicinity of said pitting station.

13. A prune pitting machine as in claim 12 in which means are provided on said frame and in said plane for receiving prunes released from said pitting station.

References Cited by the Examiner

UNITED STATES PATENTS

| | | | |
|---|---|---|---|
| 2,246,843 | 6/1941 | Drake | 146—27 |
| 2,296,645 | 9/1942 | Marsden | 198—33 |
| 2,341,857 | 2/1944 | Drake et al. | 146—27 |
| 2,360,411 | 10/1944 | Frova | 146—27 |
| 2,485,653 | 10/1949 | Peel | 146—17 |
| 2,540,020 | 1/1951 | Waters | 198—33 |
| 2,572,773 | 1/1951 | Slagle | 198—33 |
| 2,609,942 | 9/1952 | Kofoid. | |

ROBERT C. RIORDON, *Primary Examiner.*

J. SPENCER OVERHOLSER, WILLIE G. ABERCROMBIE, *Examiners.*